United States Patent
Yavuz et al.

(10) Patent No.: US 12,322,920 B2
(45) Date of Patent: Jun. 3, 2025

(54) COHERENT LIGHT SOURCE BASED ON COLLECTIVE SPONTANEOUS EMISSION

(71) Applicant: Wisconsin Alumni Research Foundation, Madison, WI (US)

(72) Inventors: Deniz Yavuz, Madison, WI (US); David Gold, Madison, WI (US); Mark Saffman, Madison, WI (US); Thad Walker, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 402 days.

(21) Appl. No.: 18/054,004

(22) Filed: Nov. 9, 2022

(65) Prior Publication Data
US 2023/0318246 A1    Oct. 5, 2023

Related U.S. Application Data

(60) Provisional application No. 63/264,680, filed on Nov. 30, 2021.

(51) Int. Cl.
*H01S 3/041* (2006.01)
*H01S 3/03* (2006.01)
*H01S 3/0943* (2006.01)
*H01S 3/227* (2006.01)
*G01C 19/66* (2006.01)

(52) U.S. Cl.
CPC .............. *H01S 3/031* (2013.01); *H01S 3/041* (2013.01); *H01S 3/0943* (2013.01); *H01S 3/227* (2013.01); *G01C 19/661* (2013.01)

(58) Field of Classification Search
CPC .............................. H01S 3/041; H01S 3/0943
See application file for complete search history.

(56) References Cited

U.S. PATENT DOCUMENTS

2017/0115431 A1 *    4/2017    Cheng .................... G02B 1/002

* cited by examiner

*Primary Examiner* — Michael Carter
(74) *Attorney, Agent, or Firm* — Boyle Fredrickson, S.C.

(57) ABSTRACT

A coherent light source provides spontaneous emission (Dicke superradiance/subradiance) using a dilute and optically thin cloud of disordered atoms. The coherent light source provides improved noise statistics over that of a laser and $\lambda$ accordingly, may be used in sensitive interferometric applications such as light gyroscopes.

13 Claims, 2 Drawing Sheets

COHERENT LIGHT SOURCE BASED ON COLLECTIVE SPONTANEOUS EMISSION

CROSS REFERENCE TO RELATED APPLICATION

The present invention claims the benefit of U.S. provisional application 62/264,680 filed Nov. 30, 2021 and hereby incorporated by reference.

STATEMENT REGARDING FEDERALLY SPONSORED RESEARCH OR DEVELOPMENT

This invention was made with government support under 2016136 awarded by the National Science Foundation. The government has certain rights in the invention.

BACKGROUND OF THE INVENTION

The present invention relates to coherent light sources and in particular to a coherent light source having improved noise statistics and possible multi-photon Fock (photon-number) state.

Coherent light sources, in which the photons have highly matched frequencies and phases, are commonly produced by lasers. In a laser, the atoms of a laser medium are stimulated to excite the electrons to the larger orbits. When these electrons decay to a lower energy state, they stimulate the decay of other excited electrons which emit additional photons having the same wavelength, phase, and direction of the stimulating photons. Sustaining this stimulated emission requires optical feedback in the form of an optical cavity and a so-called "population inversion" where more atoms are in the excited state than in a lower energy state so that stimulated emission is more probable than photon absorption.

SUMMARY OF THE INVENTION

The present invention provides a coherent light source that does not use the techniques of population inversion and stimulated emission to produce coherent light but instead promotes a collective spontaneous emission of excited atoms through quantum coupling. The coherent light produced by spontaneous emission can have improved Poisson statistics such as lower shot noise that can be beneficial in some applications. Also, the quantum mechanism underlying the generation of the coherent light may allow the generation of multiple-photon Fock states, providing effectively shorter wavelengths than would be expected from the photon excitations.

Significantly, the present invention demonstrably provides high-quality coherent light from collective spontaneous emission obtained from a large number of disordered atoms distributed diffusely over a large area by maintaining an optically thin cloud.

More specifically, in one embodiment, the invention provides a coherent light source having a chamber for receiving and retaining a group of at least 1000 gaseous state atoms and a refrigeration system for cooling the group of atoms to a temperature of less than 100 K. An excitation laser is directed into the chamber along a first axis for exciting the group of atoms to an excited state from which they decay to generate a transmitted coherent light generated by collective spontaneous emission of the group of atoms decaying from excitation. The group of atoms has a coherent figure of merit of greater than 1, defined as:

$$\left[N/\left(\frac{R}{\lambda}\right)\right]^2$$

and an incoherent figure of merit less than 1 defined as:

$$N/\left(\frac{R}{\lambda}\right)^2$$

where N is the number of atoms in the group, R is the radial size of the group along the axis of transmitted coherent light, and $\lambda$ is the wavelength of the transmitted coherent light.

It is thus a feature of at least one embodiment of the invention generate coherent light through collective spontaneous emission (Dicke-type superradiance/subradiance) in a gas cloud by controlling the cloud qualities to promote coherence emissions relative to incoherence absorption and re-emission.

The transmitted coherent light may maintain an interference contrast of greater than 0.5 at the output of a Michelson interferometer over a transverse width perpendicular to the axis of transmitted coherent light and substantially equal to 2R where contrast is defined as $(n_{max}-n_{min})/(n_{max}+n_{min})$ and where $n_{max}$ is a maximum count of photons in an interference pattern of the light with itself and $n_{max}$ is a minimum count of photons in the interference pattern of the light with itself.

It is thus a feature of at least one embodiment of the invention to provide high-quality coherent light in which coherent photons dominate over a large volume.

The group of atoms may have a width perpendicular to an axis of the transmitted coherent light of greater than 30 μm.

It is thus a feature of at least one embodiment of the invention to promote collective spontaneous emission in a relatively large gas cloud.

In some embodiments, R may be greater than 5 times the wavelength of the excitation laser.

It is thus a feature of at least one embodiment of the invention to provide spontaneous emission in a group of atoms larger than a wavelength of the excitation laser.

The excitation laser may be directed along a first axis and the transmitted coherent light maybe received along a second axis crossing the first axis.

It is thus a feature of at least one embodiment of the invention to reduce correlations between the excitation laser and the resulting correlated light output.

The group may have at least 1,000 atoms.

It is thus a feature to provide a coherent light source that can be scaled to a large number of atoms.

In some embodiments, the coherent light may produce a photon-number Fock state, which can provide an interference pattern having a shorter wavelength than the wavelength of the transmitted light.

It is thus a feature of at least one embodiment of the invention to provide a coherent light source that may provide shorter-wavelength interference.

The coherent light source may further be combined with an interferometer receiving the transmitted light and providing an optical assembly detecting interference of the transmitted light along two different paths and a detector detecting changes in an interference pattern caused by the interference.

It is thus a feature of at least one embodiment of the invention to provide for improved interferometric measurements through the use of coherent light having improved Poisson statistics such as reduced shot noise. The coherent light produced by the present invention appears to provide better statistics in this respect than conventional laser light.

These particular objects and advantages may apply to only some embodiments falling within the claims and thus do not define the scope of the invention.

DETAILED DESCRIPTION OF THE PREFERRED EMBODIMENT

Figure 1:
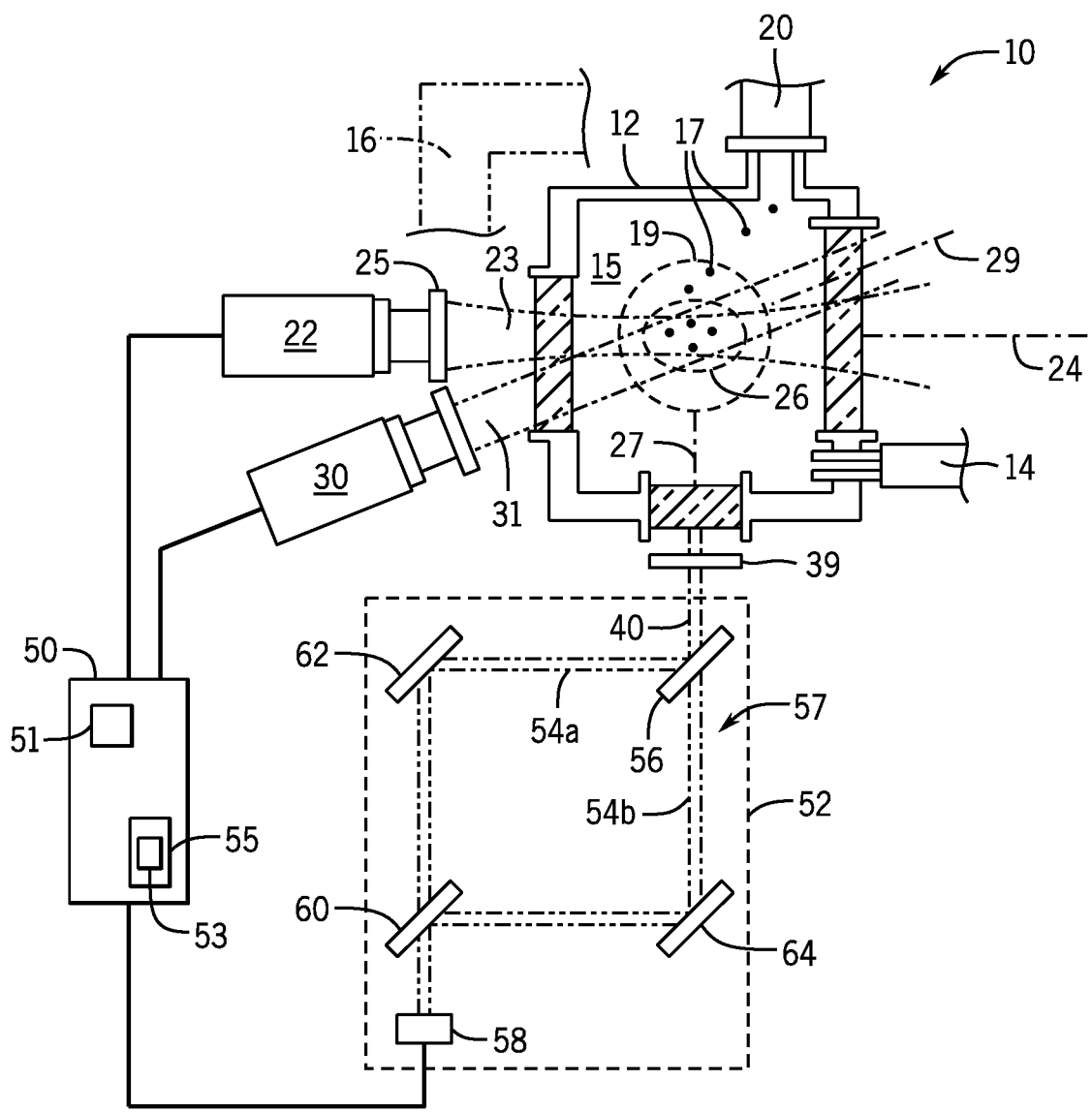
FIG. 1 is a block diagram of the principal components of the light source of the present invention showing use of the coherent light for a ring gyroscope.

Referring now to FIG. 1, a coherent light source 10 per the present invention in one embodiment may provide a vacuum chamber 12 communicating with a vacuum pump 14 to provide a low-pressure volume 15 held at a base pressure of approximately 10-9 torr. The vacuum chamber 12 may be free from elements of an optical cavity normally used by a laser, for example, partially reflective mirrors. Rubidium atoms 17 ($^{87}$Rb) are introduced from a vapor source 20 and into a MOT trap cloud 19 created within the vacuum chamber by a magneto-optical trap (MOT) 16. Other types of atoms may also be used and accordingly the invention should not be considered limited to rubidium in its broadest conception.

The MOT 16, indicated diagrammatically, uses three counter-propagating beam pairs that are locked to the F=2→F'=3 cycling transition in the D2 line of the rubidium (with a transition wavelength of 780 nm). In one nonlimiting example, the MOT 16 employs two beam pairs each having an optical power of about 40 mW and a beam radius of 3 cm. To accommodate space constraints, a third beam pair is provided that is not orthogonal to the other two, and so is smaller, with a beam radius of 5 mm and an optical power of 5 mW.

The MOT lasers may be produced by an external-cavity diode laser (ECDL) whose output is amplified by a semiconductor tapered amplifier before being split into beam pairs. The MOT lasers are overlapped with a hyperfine repumping beam, which is generated by a separate ECDL locked to the F=2→F'=2 transition with an optical power of about 1 mW. Further details regarding this laser system can be found in D. Das, B. Lemberger, and D. D. Yavuz, "Subradiance and Superradiance-to-subradiance transition in dilute atomic clouds", Phys. Rev. A 102, 043708 (2020).

The rubidium atoms 17 are loaded into the MOT trap cloud 19 maintained by the MOT 16 for about 400 ms. During the last 40 ms of loading, MOT lasers are detuned by about 8Γα from the cycling transition ($\Gamma_\alpha = 1/\tau_\alpha$, where $\tau_\alpha$ is the decay rate of the transition) and reduce in intensity by about an order of magnitude to achieve efficient sub-Doppler cooling. At the end of the MOT loading cycle, approximately 1.3 million atoms maybe trapped within a radius of 0.26 mm at an atomic temperature of about 40 μK. During the final 10 ms of the MOT loading cycle, the hyperfine repumper beam is turned off. As a result, the atoms are optically pumped into the F=2 ground level at the end of the cycle.

Referring still to FIG. 1, a trap laser 22 is then activated to create a beam 23 extending along a transverse axis 24 through a lens system 25 forming a dipole trap. The trap laser 22 has a wavelength, for example, of 1.055 μm to be far off resonance and overlap with the MOT trap cloud 19. The trap laser 22 may use a fiber-amplified ECDL and have an optical power of 0.5 W focused to a spot size of 27 μm ($1/e^2$ intensity radius), resulting in a trap-depth of 400 μK. In one example, about 11,000 atoms are transferred from the MOT trap cloud 19 to the dipole trap. The size of the dipole trap cloud 26 confined by the dipole trap may be, in one example, 9 μm×9 μm×360 μm (all dimensions are measured from the center of the trap cloud 26) with the longest dimension generally aligned with transverse axis 24 as a result of the geometry of the trap.

After the dipole trap cloud 26 is loaded, the MOT laser beams are turned off and the rubidium atoms 17 remain trapped by the dipole trap for 50 ms. At the end of 50 ms, the dipole trap is turned off allowing the atomic cloud to expand for a predetermined amount of time after which an excitation pulse is provided by an excitation laser 30 for approximately 200 ns providing a beam 31 covering the expanded dipole trap cloud 26. The excitation laser 30 can make use of one of the MOT trapping lasers, shifting its frequency by using an acousto-optic modulator (AOM), and seeding a separate tapered amplifier. The excitation laser 30 produces a beam 31 along an excitation axis 29 ideally parallel to transverse axis 24 as much as practical given the physical constraints of the optical systems.

Figure 2:
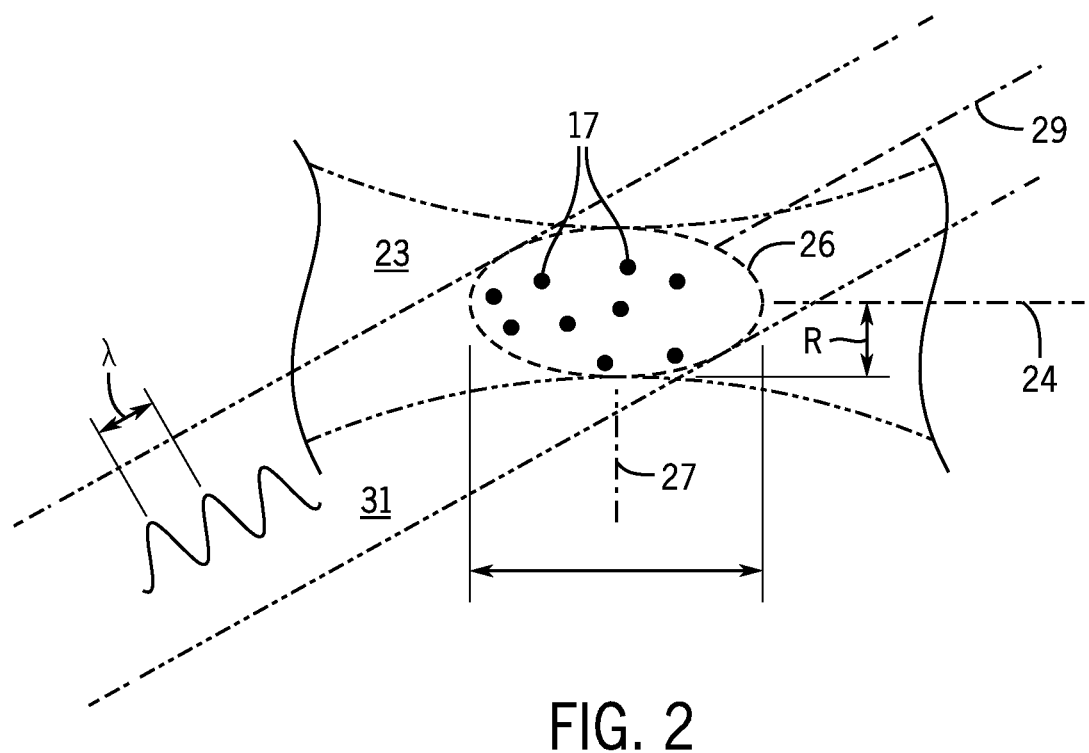
FIG. 2 is a detailed schematic representation of the excited atoms experiencing quantum coupling.

Referring now generally to FIG. 2, the excitation laser 30 will produce an excitation light beam 31 having a wavelength λ generally matching the desired energy needed for excitation of the rubidium atoms 17. Generally, the excitation laser will produce an excited state in as few as 0.3 or 30% of the atoms within the dipole trap cloud 26 and much less than 50% or more needed for population inversion. The excitation beam 31 is quickly turned off using the AOM having a turnoff time of 8 ns revealing a coherent light beam 40 emitted from the dipole trap cloud 26 along an emission axis 27 generally crossing the excitation axis 29 (ideally perpendicular) to the beam 31. The inventors have characterized this coherent light beam 40 using a Michelson interferometer receiving light from different portions of the dipole trap cloud 26 to establish that the light throughout this region of the dipole trap cloud 26 is coherent. The coherence is established using collective spontaneous emission rather than laser-type stimulated emission.

As noted above, the wavelength of the excitation laser 30, for example, 1.055 μm, may be much smaller than the size of the dipole trap cloud 26. The inventors have determined that despite the fact that the dipole trap cloud 26 is much larger than the wavelength of the excitation laser beam 31 thought to be a limit for quantum coupling, a spontaneous emission is induced in the disordered dilute system of atoms over a relatively large volume of the dipole trap cloud 26.

Figure 3:
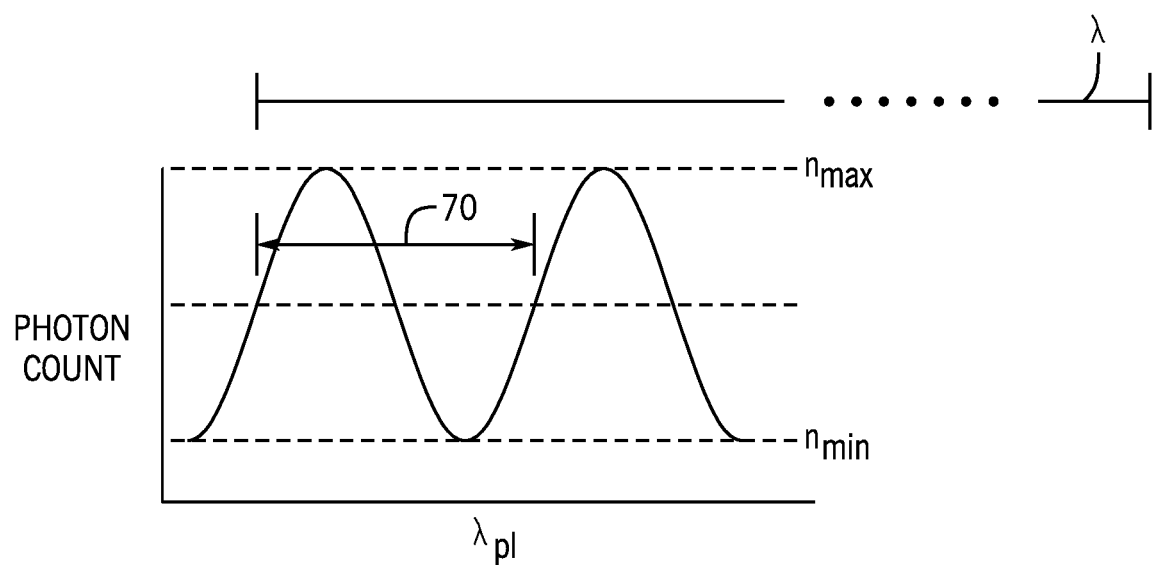
FIG. 3 is a graph depicting an interference measurement of the resulting light showing a high degree of phase coherence.

Referring now to FIG. 3, a Michelson interferometer analysis of the emitted coherent light beam 40 producing an interference pattern indicates a high degree of phase correlation having a contrast $(n_{max} - n_{min})/(n_{max} + n_{min})$ where n is the photon count. The contrast obtained, for example, was greater than 0.5 over more than 35 μm length along the transverse axis 24 of the dipole trap cloud 26. In some cases, the interference pattern had a periodicity 70 as a function of path length change $\lambda_{pl}$ greater than the wavelength λ of the excitation laser resulting from multi-photon up conversion, potentially allowing allows higher resolution interferometric measurements.

The ability to provide a high-quality coherent light beam 40 from a disordered (gaseous state) set of atoms relies on a cooling of the atoms so that atomic motion during the decay of the electrons during the spontaneous emission is low. Typically such cooling will be a temperature of less than 100 μK. Importantly too, the inventors have determined that the qualities of the atoms in the dipole trap cloud 26 must provide an optically thin layer so that the light is dominated by coherent emissions rather than incoherent absorption and reemission events. This can be characterized by a coherent figure of merit defined as:

$$\left[N/\left(\frac{R}{\lambda}\right)\right]^2$$

and an incoherent figure of merit defined as:

$$N/\left(\frac{R}{\lambda}\right)^2$$

where N is the number of atoms in the group, R is the radial size of the dipole trap cloud 26 along the emission axis 27 of transmitted coherent light beam 40, and X is the wavelength of the transmitted coherent light. In the present invention the coherent figure of merit is desirably greater than one and the incoherent figure of merit is desirably less than one ensuring that coherent emissions dominate.

In some embodiments the coherent figure of merit may be in excess of 200. The incoherent figure of merit may be rewritten by the optical depth of the sample along emission axis 27 expressed as:

nσR where n is the number density of absorbers (rubidium atoms 17), σ is the absorption cross-section for each atom through which the coherent light beam 40 must travel, and R is the average distance (radius of the dipole trap cloud 26). In some embodiments the incoherent figure of merit may be less than 0.1.

Experiments have determined that atomic density (per cubic centimeter) of the rubidium atoms 17 within the dipole trap cloud 26 may be desirably greater than $10^8$ and preferably greater than $10^9$ to promote the highest levels of super-radiance and sub-radiance.

Referring again to FIG. 1, an electronic computer 50 employing a processor 51 for executing a program 53 stored in computer memory 55 may be used to control the excitation laser 30 and the trap laser 22 to control the timing of the coherent light beam 40 to provide regular controllable pulses of coherent light. This light may be used for applications replacing lasers, for example, in an interferometer 57 or providing a light gyroscope 52.

In such an application, the coherent light beam 40 may be received by a collimating lens system 39 and split into two beams 54a and 54b along different counter-cyclic paths, for example, by a beam splitter 56 to proceed in counterclockwise and clockwise loops, respectively. In this regard, beam 54a may be reflected on reflector 62 to be directed to a photon counting detector 58, whereas beam 54 may be reflected off of reflector 64 and then off of a beam combiner 60 to be superimposed with beam 54a as received by the photon counting detector 58. An effective path length change $\lambda_{pl}$ caused by rotation of the light gyroscope 52 and resulting from the Sagnac effect produces a phase difference between the beams 54a and 54b causing a temporally changing interference pattern measured by the photon counting detector 58. A signal from the photon counting detector 58 is then used to deduce rotational angle when monitored by the computer 50 in a manner analogous to a laser gyroscope. In this case, the higher fringe rate of the interference pattern produced by the high photon-number state of the output coherent light beam 40 may provide a higher degree of resolution, and the improved Poisson statistics may provide a higher signal-to-noise ratio for low flux coherent light beams 40.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A coherent light source comprising:
a chamber for receiving and retaining a group of at least 1000 gaseous state atoms;
a refrigeration system for cooling the group of atoms to a temperature of less than 100 μK; and
an excitation laser directed into the chamber along a first axis for exciting the group of atoms to an excited state from which they decay to generate a transmitted coherent light;

wherein the transmitted coherent light is generated by collective spontaneous emission of the group of atoms decaying from excitation from the excitation laser to provide coherent light; and wherein the group of atoms has a coherent figure of merit of greater than 1, defined as:

$$\left[N\left(\frac{R}{\lambda}\right)\right]^2$$

and an incoherent figure of merit less than 1 defined as:

$$N\left(\frac{R}{\lambda}\right)^2$$

where N is a number of atoms in the group, R is the radial size of the group along the axis of transmitted coherent light, and $\lambda$ is the wavelength of the transmitted coherent light.

2. The coherent light source of claim 1 wherein the transmitted coherent light maintains an interference contrast of greater than 0.5 as measured at the output of a Michelson interferometer over a transverse width perpendicular to the axis of transmitted coherent light and substantially equal to 2R where contrast is defined as $(n_{max} - n_{min})/(n_{max} + n_{min})$ and where $n_{max}$ is a maximum count of photons in an interference pattern of the light with itself and $n_{max}$ is a minimum count of photons in the interference pattern of the light with itself.

3. The coherent light source of claim 1 wherein the group of atoms has a width perpendicular to an axis of the transmitted coherent light of greater than 30 μm.

4. The coherent light source of claim 1 wherein R is greater than 5 times a wavelength of the excitation laser.

5. The coherent light source of claim 1 wherein the excitation laser is directed along a first axis and the transmitted coherent light is received along a second axis crossing the first axis.

6. The coherent light source of claim 1 wherein the group has at least 1,000 atoms.

7. The coherent light source of claim 1 wherein transmitted light can have a multiple-photon Fock (photon-number) state to provide an interference pattern with a period less than the wavelength of the transmitted light.

8. The coherent light source of claim 1 wherein the excitation laser excites less than 50% of the group of atoms into excitation at any time.

9. The coherent light source of claim 1 wherein the group is free from feedback from an optical cavity.

10. The coherent light source of claim 1 wherein the atoms are rubidium.

11. The coherent light source of claim 1 further including an interferometer receiving the transmitted light and providing an optical assembly detecting interference of the transmitted light along two different paths and a detector detecting changes in an interference pattern caused by the interference.

12. The coherent light source of claim 11 wherein at least one of the two different paths is a loop and the interferometer provides a gyroscope output indicating rotational angle.

13. The coherent light source of claim 1 wherein the standard deviation of the photon-number statistics is reduced at least by 10%.

* * * * *